(12) United States Patent
Barajas Gonzalez et al.

(10) Patent No.: US 9,934,236 B2
(45) Date of Patent: Apr. 3, 2018

(54) STREAMLINING DATA DEDUPLICATION

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 14/629,264

(22) Filed: Feb. 23, 2015

(65) Prior Publication Data

US 2016/0246812 A1 Aug. 25, 2016

(51) Int. Cl.
*G06F 17/30* (2006.01)
*G06F 3/06* (2006.01)

(52) U.S. Cl.
CPC ...... *G06F 17/30156* (2013.01); *G06F 3/0641* (2013.01)

(58) Field of Classification Search
CPC .......... G06F 17/30156; G06F 3/0641
See application file for complete search history.

(56) References Cited

U.S. PATENT DOCUMENTS

| | | | |
|---|---|---|---|
| 5,990,810 A | 11/1999 | Williams | |
| 8,131,687 B2 | 3/2012 | Bates et al. | |
| 8,176,104 B2 | 5/2012 | Cannon et al. | |
| 8,478,799 B2 | 7/2013 | Beaverson et al. | |
| 8,572,163 B1 | 10/2013 | Bromley et al. | |
| 8,688,651 B2* | 4/2014 | Kennedy | G06F 11/1453 707/692 |
| 8,732,411 B1 | 5/2014 | Chaterjee et al. | |
| 8,762,352 B2 | 6/2014 | Amit et al. | |
| 8,793,226 B1 | 7/2014 | Yadav et al. | |
| 8,799,601 B1 | 8/2014 | Chen et al. | |

(Continued)

OTHER PUBLICATIONS

Wildani et al., "Hands: A Heuristically Arranged Non-Backup In-line Deduplication System" 13 pages, International Conference on Data Engineering (ICDE), 2013, http://www.ssrc.ucsc.edu/, Technical Report UCSC-SSRC-12-03, Mar. 2012, University of California, Santa Cruz.

(Continued)

*Primary Examiner* — Jeff A Burke
(74) *Attorney, Agent, or Firm* — Griffiths & Seaton PLLC

(57) ABSTRACT

Various embodiments for streamlining data deduplication by a processor. In file storage utilizing re-writable storage media with data deduplication, a host layer file system is informed of available file space based on at least one of an available plurality of tracking operations performed by the processor, thereby providing an adjustable virtual free capacity file of deduplication pointers to facilitate deduplication functionality across a plurality of storage devices. As one of the available plurality of tracking devices, an actual block utilization tracking operation is utilized for gathering periodic statistics from deduplicating sources to enable analysis of trends in storage capacity utilization.

19 Claims, 5 Drawing Sheets

(56) References Cited

U.S. PATENT DOCUMENTS

| | | | | |
|---|---|---|---|---|
| 8,918,605 B2* | 12/2014 | Aronovich | .......... | G06F 11/3485 |
| | | | | 711/154 |
| 8,959,293 B2* | 2/2015 | Kalach | .................. | G06F 3/0608 |
| | | | | 707/664 |
| 8,996,800 B2* | 3/2015 | Venkatesh | ......... | G06F 17/30132 |
| | | | | 711/113 |
| 9,158,458 B2* | 10/2015 | Umbehocker | ........ | G06F 9/5016 |
| 9,223,511 B2 | 12/2015 | Rudelic | | |
| 9,384,205 B1* | 7/2016 | Gipp | ................. | G06F 17/30156 |
| 9,454,321 B1* | 9/2016 | Smaldone | ............... | G06F 3/061 |
| 9,483,484 B1* | 11/2016 | Sridharan | ........... | G06F 17/3015 |
| 9,575,673 B2* | 2/2017 | Mitkar | .................. | G06F 3/0619 |
| 9,619,479 B1 | 4/2017 | Zhang et al. | | |
| 9,753,955 B2 | 9/2017 | Agrawal et al. | | |
| 2010/0070544 A1* | 3/2010 | Gopalan | ............... | G06F 3/0607 |
| | | | | 707/822 |
| 2013/0262758 A1 | 10/2013 | Smith et al. | | |
| 2013/0326115 A1 | 12/2013 | Goss et al. | | |
| 2014/0025872 A1 | 1/2014 | Flynn et al. | | |
| 2014/0280382 A1* | 9/2014 | Gabay | .................. | G06Q 10/087 |
| | | | | 707/812 |

OTHER PUBLICATIONS

Srinivasan et al., "iDedup: latency-aware, inline data deduplication for primary storage", FAST. vol. 12, 2012.

\* cited by examiner

STREAMLINING DATA DEDUPLICATION

BACKGROUND OF THE INVENTION

Field of the Invention

The present invention relates in general computing systems, and more particularly to, various embodiments for restructuring deduplicated data to enhance efficiency in computing storage environments.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various embodiments for streamlining data deduplication by a processor are provided. In one embodiment, by way of example only, a method for streamlining data deduplication by a processor is provided. In file storage utilizing re-writable storage media with data deduplication, a host layer file system is informed of available file space based on at least one of an available plurality of tracking operations performed by the processor, thereby providing an adjustable virtual free capacity file of deduplication pointers to facilitate deduplication functionality across a plurality of storage devices. As one of the available plurality of tracking devices, an actual block utilization tracking operation is utilized for gathering periodic statistics from deduplicating sources to enable analysis of trends in storage capacity utilization.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
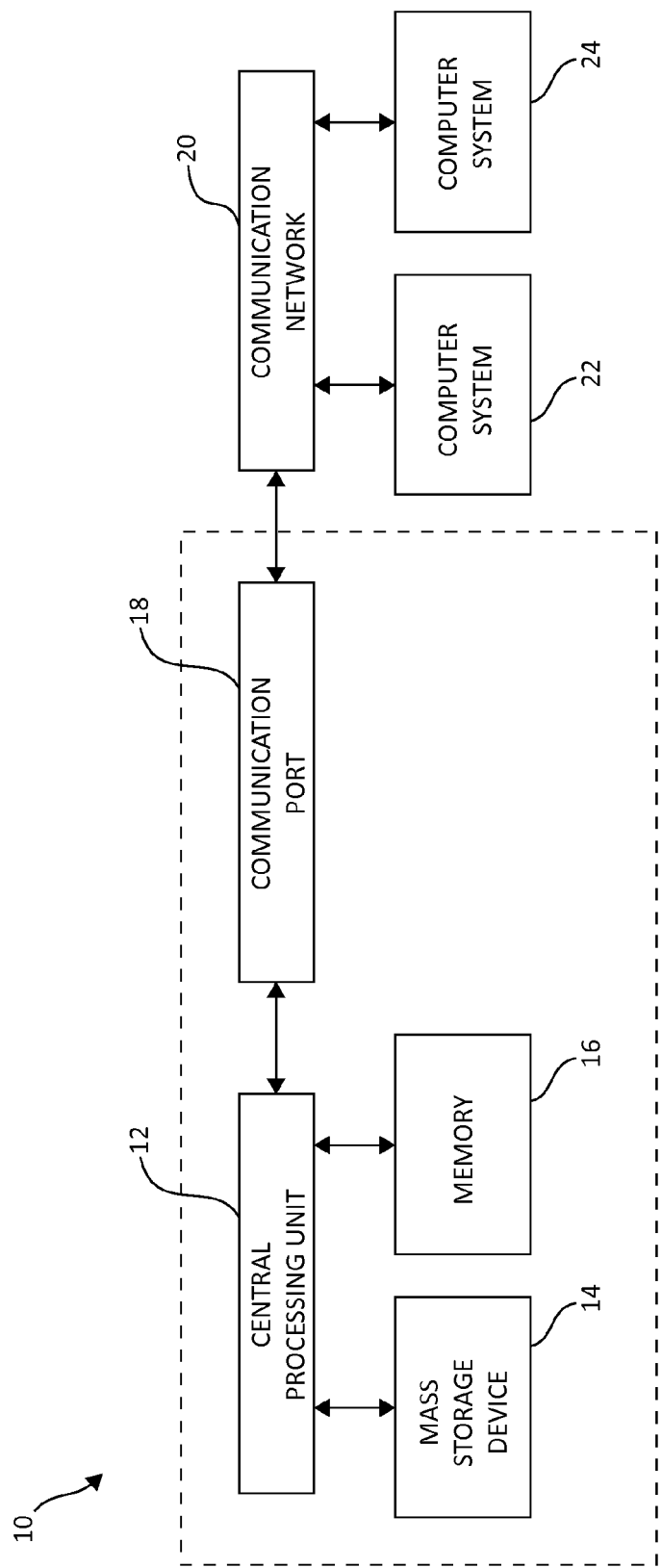
FIG. 1 is an exemplary block diagram showing a hardware structure for performing streamlining data deduplication and data management functionality, in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

Traditionally, storage has been a static proposition when seen from the operating system perspective. Drives were constructed with exact specifications of available capacity, regardless of the type of information being stored within them. This resulted in a situation where storage is predictable, but static in relation to the variability of data being contained on the particular storage medium.

With the advent of data deduplication, the traditional storage model has been dramatically changed. This is largely by way of having data that used to be written multiple times now only necessitating to be written once, and subsequently referred to by pointers. Operating systems, using legacy file system models that have been in use for decades, are now faced with the challenge of managing data that is being stored, but is not always physically written. These legacy systems currently have no method to retain an account for actual data capacity savings that deduplication provides, for example.

In addition, these systems may contain a wide variety of implemented data management technologies that may, for example, depend on the age of the component, architecture, or other factors. In view of the current state of data storage management, a ground-up architecture change would be necessary for a user to take advantage of what is quickly becoming the norm in data retention. Furthermore, among other challenges, the disparity in storage management creates a vacuum between, for example, enterprise storage solutions and other commonly used data retention methods used by small businesses, home and mobile users.

To address these challenges described above, the mechanisms of the illustrated embodiments, among other attendant functionality, inform a computer operating system of appropriate available space on a particular file system once certain deduplication algorithms have reduced the consumption of data being stored. By using exact deduplicable data, the presented available space at the file system level may be manipulated such that the operating system is able to dynamically utilize the newly available capacity. This eliminates the need for the operating system to be aware of the deduplication of data, allowing the operating system to view additional space as available when successful deduplication is occurring in the background.

Deduplication functionality may occur either in-line, in software, or via drive level firmware. The mechanisms of the illustrated embodiments obtain the needed statistics from these deduplication processes to allow for the accurate accounting of capacity utilization and the accurate prediction of future usage patterns. Moreover, the mechanisms allow the user to bring deduplication methodologies to systems that are presently unable to take advantage of deduplication functionality. These mechanisms are applicable to servers, desktops, client systems, and even advanced mobile devices such as smart phones and tablet devices. Using analytics, the mechanisms of the illustrated embodiments, among other benefits, predict future usage patterns and present predicted available capacity in real-time to the operating system, such that the indicated capacity may be immediately utilized by the computing storage environment.

The mechanisms of the illustrated embodiments incorporate a variety of analytics, of what will be termed "tracking operations," following. These analytics encompass, among other features, the following functions: (1) an actual block utilization testing operation, (2) an un-deduplicated utilization tracking operation, (3) a virtual storage device capacity tracking and modification operation, (4) a file system-level capacity modification and reporting operation, and a deduplication rate over time tracking operation for both algorithmic and system administration. Each of this varied functionality will be described further in detail, following.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
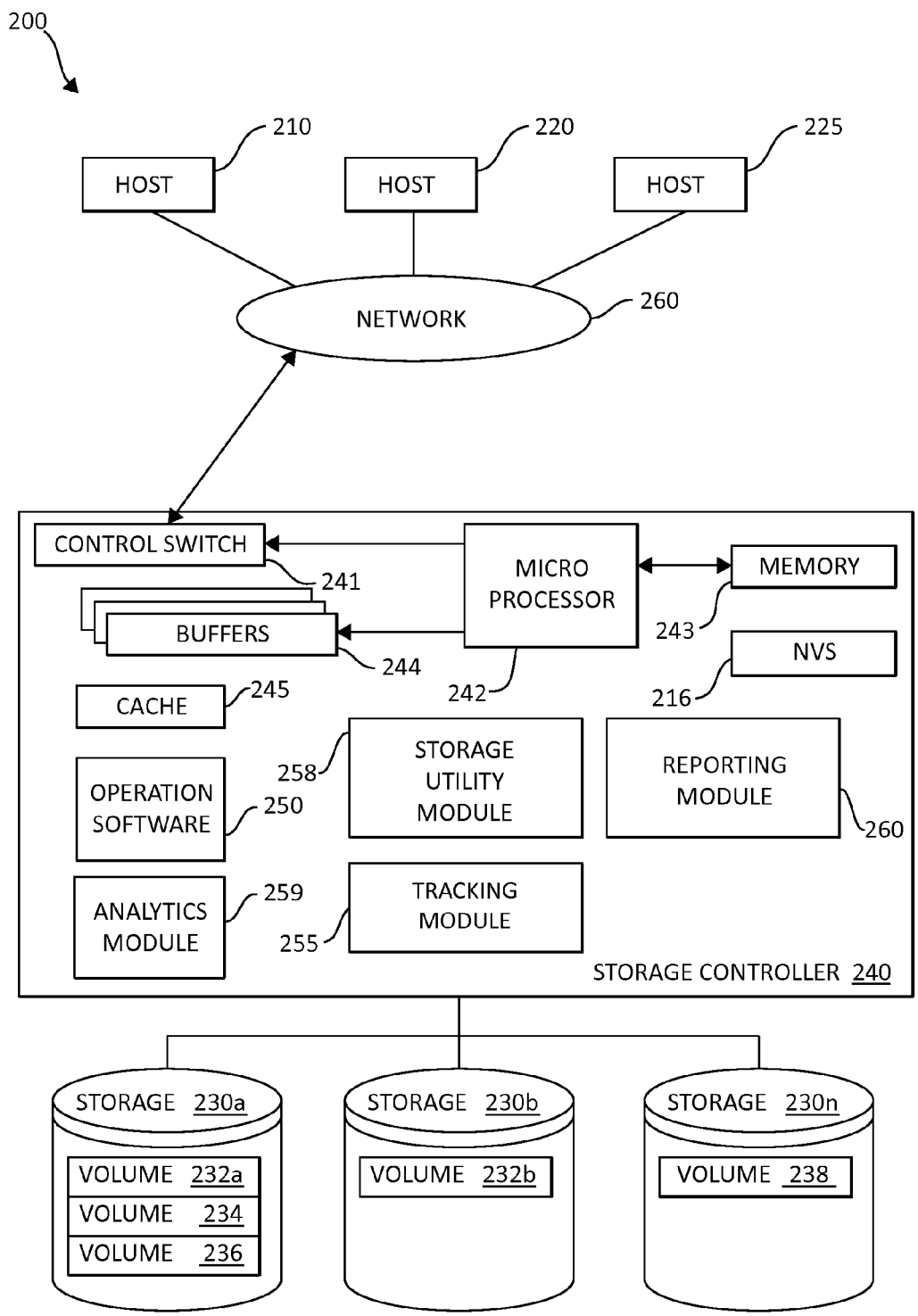
FIG. 2 is an exemplary block diagram showing a hardware structure of a data storage system in a computing storage environment, again in which aspects of the present invention may be realized.

FIG. 2 is an exemplary block diagram 200 showing a hardware structure of a data storage and deduplication system that may be used in the overall context of performing video deduplication functionality. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, a storage utilization module 258, and a reporting module 260. The tracking module 255, storage utilization module 258 and reporting module 260 may operate in conjunction with each and every component of the storage controller 240, the hosts 210, 220, 225, and storage devices 230. The tracking module 255, storage utilization module 258 and reporting module 260 may be structurally one complete module or may be associated and/or included with other individual modules. The tracking module 255, storage utilization module 258 and reporting module 260 may also be located in the cache 245 or other components.

The tracking module 255, storage utilization module 258 and reporting module 260 may individually and/or collectively perform various aspects of the present invention as will be further described. For example, the tracking module 255 may perform tracking operations and related analytics in accordance with aspects of the illustrated embodiments. The storage utilization module 258 may also utilize analytics to determine physical or virtual storage capacities in view of deduplication functionality operational on particular storage devices. Finally, reporting module 260 may notify various portions of the data storage and deduplication system 200 about such various aspects as current capacity utilization, and so forth. As one of ordinary skill in the art will appreciate, the tracking module 255, storage utilization module 258, and reporting module 260 may make up only a subset of various functional and/or functionally responsible entities in the data storage and deduplication system 200.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the base-block generation module 257, the audio waveform module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
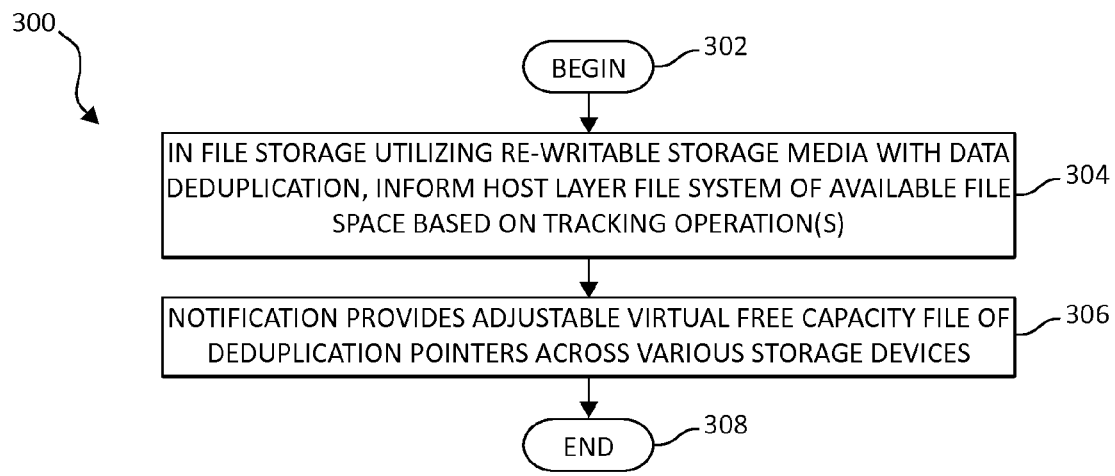
FIG. 3 is a flow chart diagram illustrating an exemplary method for streamlining deduplicated data processing in accordance with various aspects of the present invention.

Turning now to FIG. 3, a flow chart diagram, illustrating an exemplary method 300 for streamlining data deduplication to non-deduplication based storage, among other aspects of the illustrated embodiments, is depicted. Method 300 begins (step 302). In file storage utilizing re-writable storage media with data deduplication, a host-layer file system is informed of available file space based on analytics performed by one or more tracking operations (step 304). As will be further described, the analytics detailed herein may be applicable to a wide variety of computing storage components in a wide variety of storage environments, notwithstanding the storage devices and/or storage media is implemented with data deduplication. In other words, although a portion of the file storage is implemented with data deduplication, the mechanisms of the illustrated embodiments extend the notification functionality to devices and media that are not implemented with data deduplication. In doing so, the mechanisms of the illustrated embodiments, extend benefits provided by data deduplication to an entire interconnected storage environment, for example.

The notification to the host-layer file stem of the available file space thereby provides an adjustable virtual free capacity file of deduplication pointers that may be used across a variety of storage devices and storage media, notwithstanding whether those devices/media are implemented themselves with data deduplication functionality (step 306). The method then ends (step 308).

The following exemplary tracking and modification operations may be implemented by the mechanisms of the illustrated embodiments to be applied as analytics as will be further described. The information obtained from these analytics may then be used to generate the notifications of available file capacity to inform the host system, and also to perform system-wide modifications for data storage management. A first exemplary tracking operation is an actual block utilization tracking operation. The mechanisms of the illustrated embodiments gather periodic statistics from the de-duplicated drive or de-duplication software that enables analysis of trends in capacity utilization. In one embodiment, this information is gathered and stored in a small metadata allotment found on the file system that is being tracked. Statistics may be stored on a sliding scale, with data points being dropped and averaged over time to allow deduplication rate tracking algorithms according to the present invention to reference and function.

A second exemplary tracking operation is an un-deduplicated utilization tracking operation. To facilitate deduplication rate tracking algorithms according to the present invention, historical data points of file system capacity utilization may be collected and stored in conjunction with the actual block utilization tracking Historical trend analysis of file system level utilization helps in predicting future use, as well as providing data points to calculate and report the capacity savings of the deduplication process.

A third exemplary tracking and modification operation includes a virtual capacity tracking and modification operation. In general, a relatively static value of the virtual capacity may be reported by the data storage device firmware to the operating system. Working in conjunction with the appropriate firmware Application Programming Interfaces (APIs), the mechanisms of the illustrated embodiments may increase the virtual capacity reported by the drive as determined by the utilization of the virtual and physical capacities. As with any device capacity re-size, and as one of ordinary skill in the art will appreciate, steps may be needed at the operating system level to realize the increased capacity of the drive.

A fourth exemplary tracking and modification operation includes a file system-level modification and reporting operation. In one embodiment, a dynamic logical file is implemented to be residing on the file system, that increases or decreases in size to adjust the remaining free capacity so the operating system is able to seamlessly utilize changes in available space as directed by the device firmware. This file contains a block of fully deduplicable data, which can be logically increased or decreased as needed by the system software. In one embodiment, the file may include multiple pointers to the deduplicable block, obviating the need for physical data to actually consume capacity. This provides remaining free space elasticity within the file system so that changes to the reported capacity can be immediately leveraged by the operating system.

Finally, a fifth exemplary tracking and modification operation include a deduplication rate over time tracking operation, applicable for both algorithmic functions and system administration. In one embodiment, ongoing deduplication rates will be stored for use by predictive mechanisms of the illustrated embodiments to provide clear information regarding future utilization. This will be used to facilitate the manipulation of available capacity at the file system layer based on both actual and predicted future utilization. Reports may then be generated, enabling system owners to see both the historical utilization and the predicted utilization rates of the data storage device, and assist in capacity forecasting.

By utilizing one, some or all of these aforementioned functional features, any user can effectively run data deduplication on any device using the base system architecture as it currently stands. Accordingly, one of the goals of the mechanisms of the illustrated embodiments is to allow for data deduplication to occur essentially "behind the curtain" of the operating system. As such, the only thing the operating system will be aware of (as is typical) is a size of a particular drive, which the mechanisms of the illustrated embodiments may vary as appropriately dependent upon a particular deduplication rate.

Figure 4A:
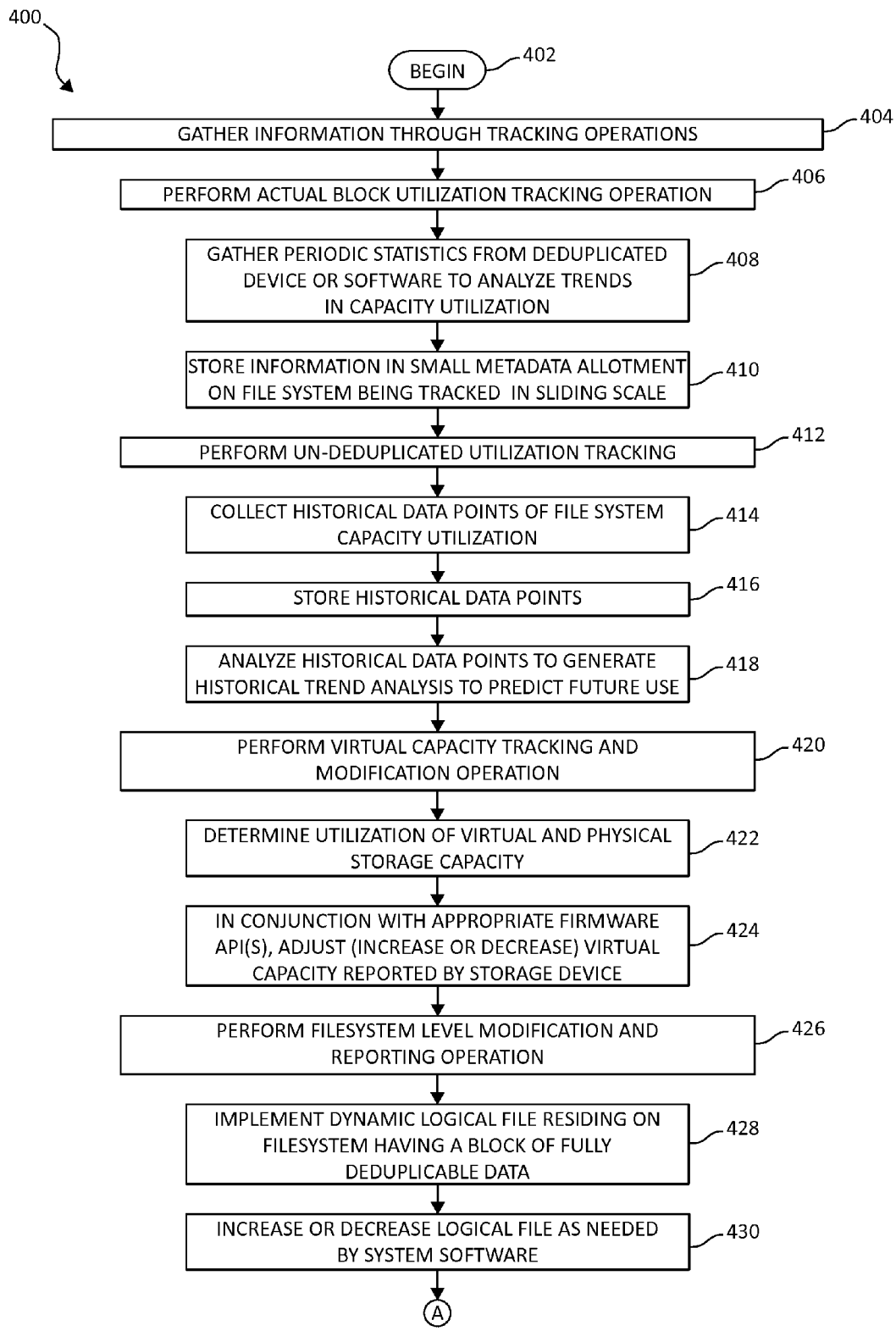
FIG. 4A is an additional flow chart diagram illustrating an additional exemplary method for streamlining storage of deduplicated data, including performance of various specified tracking operations, again in which aspects of the present invention may be implemented.

FIG. 4A, following, is an additional flow chart diagram depicting an exemplary method 400 for streamlining storage of deduplicated data (by, for example, leveraging the deduplicated data across a variety of devices and media) in accordance with various aspects of the illustrated embodiments. Method 400 begins (step 402) as a variety of information is gathered through various tracking and modification operations, as necessary (step/block 404).

Inclusive of the tracking and modification operations are an actual block utilization tracking operation (step/block 406). Periodic statistics are gathered from one or more deduplicated devices and/or software to analyze trends in capacity utilization (step 408). In addition, information is stored in a small metadata allotment on the file system being tracked in a sliding scale (step 410).

Also inclusive of the tracking and modification operations are an un-deduplicated utilization tracking operation (step/block 412). Historical data points of the file system capacity utilization are collected (step 414). The historical data points are stored (step 416), and then analyzed to generate historical trend analyses to predict future data use (step 418).

Inclusive also in the tracking and modification operations are virtual capacity tracking and modification operations (step/block 420). A determination is made of utilization of virtual and physical storage capacity (step 422). In conjunction with the appropriate APIs, an adjustment (increase or decrease) of the virtual capacity reported by the storage device is performed (step 424).

Figure 4B:
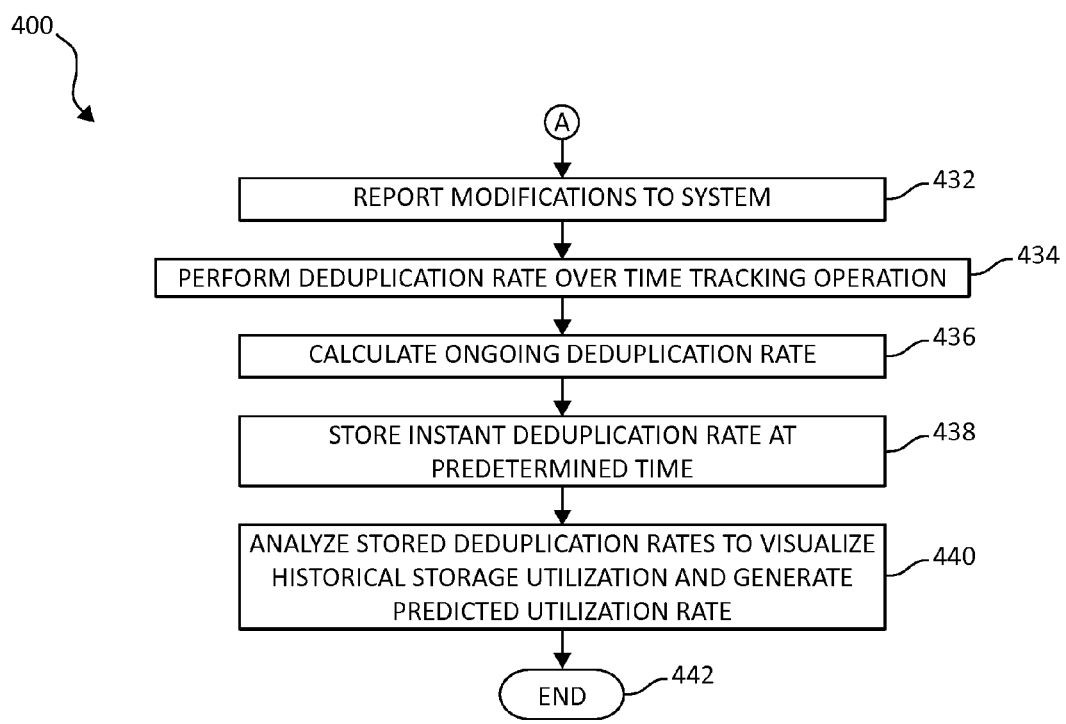
FIG. 4B is a continuation of the flow chart diagram of FIG. 4A, previously.

Inclusive also in the tracking and modification operations are file system-level modification and reporting operations (step/block 426). A dynamic logical file residing on the file system, having a block of fully deduplicable data is implemented (step 428). The size of the logical file is increased or decreased as needed by the system software (step 430). Continuing to FIG. 4B, following, any modifications are reported to the system (step 432).

Finally, inclusive in the tracking and modification operations are deduplication rate-over-time tracking operations (step/block 434). An ongoing deduplication rate is calculated (step 436). The calculated deduplication rate is stored at predetermined times (step 438). The stored deduplication rates are then analyzed to visualize historical storage utilization and generate predicted utilization rates (step 440). The method 400 then ends (step 442).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for streamlining data deduplication by a processor, comprising:
   in file storage utilizing re-writable storage media with data deduplication, informing a host layer file system of available file space based on at least one of an available plurality of tracking operations performed by the processor, thereby providing an adjustable virtual free capacity file of deduplication pointers to facilitate deduplication functionality across a plurality of storage devices;
   wherein as one of the available plurality of tracking devices, an actual block utilization tracking operation is utilized for gathering periodic statistics from deduplicating sources to enable analysis of trends in storage capacity utilization.

2. The method of claim 1, wherein the adjustable virtual free capacity file of deduplication pointers facilitates deduplication functionality across the plurality of storage devices notwithstanding whether the plurality of storage devices are configured to perform deduplication operations.

3. The method of claim 1, further including, as one of the available plurality of tracking operations, utilizing an un-deduplicated utilization tracking operation for collecting and analyzing historical trends of file system level utilization to assist in predicting future storage use.

4. The method of claim 1, further including, as one of the available plurality of tracking operations, utilizing a virtual capacity tracking and modification operation for increasing a virtual capacity reported by a storage device as determined by a utilization of a virtual and physical capacity of the storage device.

5. The method of claim 1, further including, as one of the available plurality of tracking operations, utilizing a file system level modification and reporting operation having a block of fully deduplicable data that can be logically increased or decreased to provide free space elasticity.

6. The method of claim 1, further including, as one of the available plurality of tracking operations, utilizing a deduplication rate-over-time operation for retaining calculated ongoing deduplication rates to be used to facilitate a manipulation of available capacity at a file system layer based on at least one of actual and predicted future utilization.

7. A system for streamlining data deduplication, comprising:
a processor that, in file storage, utilizes re-writable storage media with data deduplication, informing a host layer file system of available file space based on at least one of an available plurality of tracking operations performed by the processor, thereby providing an adjustable virtual free capacity file of deduplication pointers to facilitate deduplication functionality across a plurality of storage devices;
wherein as one of the available plurality of tracking devices, an actual block utilization tracking operation is utilized for gathering periodic statistics from deduplicating sources to enable analysis of trends in storage capacity utilization.

8. The system of claim 7, wherein the adjustable virtual free capacity file of deduplication pointers facilitates deduplication functionality across the plurality of storage devices notwithstanding whether the plurality of storage devices are configured to perform deduplication operations.

9. The system of claim 8, wherein the processor, pursuant to one of the available plurality of tracking operations, utilizes an un-deduplicated utilization tracking operation for collecting and analyzing historical trends of file system level utilization to assist in predicting future storage use.

10. The system of claim 8, wherein the processor, pursuant to one of the available plurality of tracking operations, utilizes a virtual capacity tracking and modification operation for increasing a virtual capacity reported by a storage device as determined by a utilization of a virtual and physical capacity of the storage device.

11. The system of claim 8, wherein the processor, pursuant to one of the available plurality of tracking operations, utilizes a file system level modification and reporting operation having a block of fully deduplicable data that can be logically increased or decreased to provide free space elasticity.

12. The system of claim 8, wherein the processor, pursuant to one of the available plurality of tracking operations, utilizes a deduplication rate-over-time operation for retaining calculated ongoing deduplication rates to be used to facilitate a manipulation of available capacity at a file system layer based on at least one of actual and predicted future utilization.

13. A computer program product for streamlining data deduplication by a processor, the computer program product comprising a non-transitory computer-readable storage medium having computer-readable program code portions stored therein, the computer-readable program code portions comprising:
a first executable portion that, in file storage, utilizes re-writable storage media with data deduplication, informing a host layer file system of available file space based on at least one of an available plurality of tracking operations performed by the processor, thereby providing an adjustable virtual free capacity file of deduplication pointers to facilitate deduplication functionality across a plurality of storage devices;
wherein as one of the available plurality of tracking devices, an actual block utilization tracking operation is utilized for gathering periodic statistics from deduplicating sources to enable analysis of trends in storage capacity utilization.

14. The computer program product of claim 13, wherein the adjustable virtual free capacity file of deduplication pointers facilitates deduplication functionality across the plurality of storage devices notwithstanding whether the plurality of storage devices are configured to perform deduplication operations.

15. The computer program product of claim 13, further including a second executable portion that, pursuant to one of the available plurality of tracking operations, utilizes an actual block utilization tracking operation for gathering periodic statistics from deduplicating sources to enable analysis of trends in storage capacity utilization.

16. The computer program product of claim 13, further including a second executable portion that, pursuant to one of the available plurality of tracking operations, utilizes an un-deduplicated utilization tracking operation for collecting and analyzing historical trends of file system level utilization to assist in predicting future storage use.

17. The computer program product of claim 13, further including a second executable portion that, pursuant to one of the available plurality of tracking operations, utilizes a virtual capacity tracking and modification operation for increasing a virtual capacity reported by a storage device as determined by a utilization of a virtual and physical capacity of the storage device.

18. The computer program product of claim 13, further including a second executable portion that, pursuant to one of the available plurality of tracking operations, utilizes a file system level modification and reporting operation having a block of fully deduplicable data that can be logically increased or decreased to provide free space elasticity.

19. The computer program product of claim 13, further including a second executable portion that, pursuant to one of the available plurality of tracking operations, utilizes a deduplication rate-over-time operation for retaining calculated ongoing deduplication rates to be used to facilitate a manipulation of available capacity at a file system layer based on at least one of actual and predicted future utilization.

\* \* \* \* \*